Patented Jan. 28, 1941

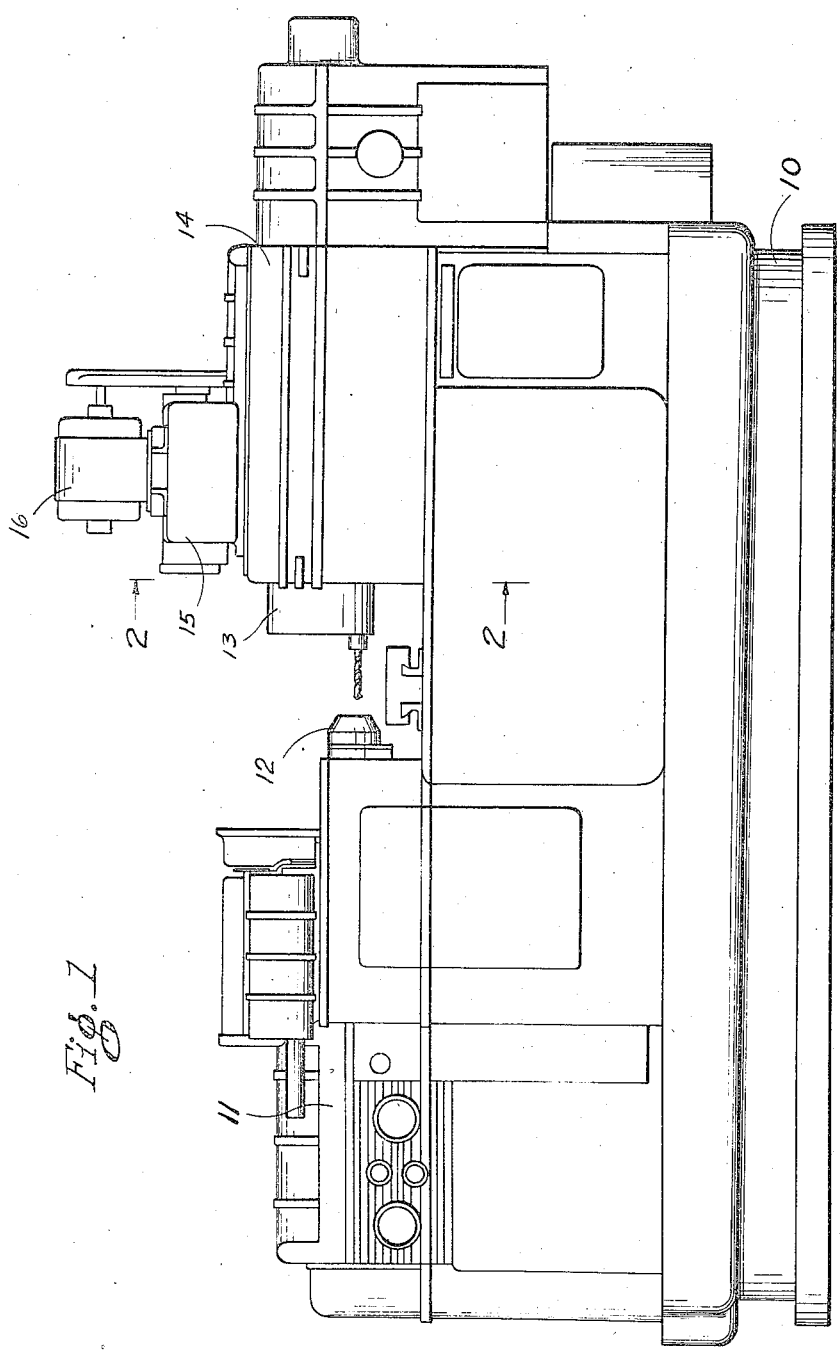

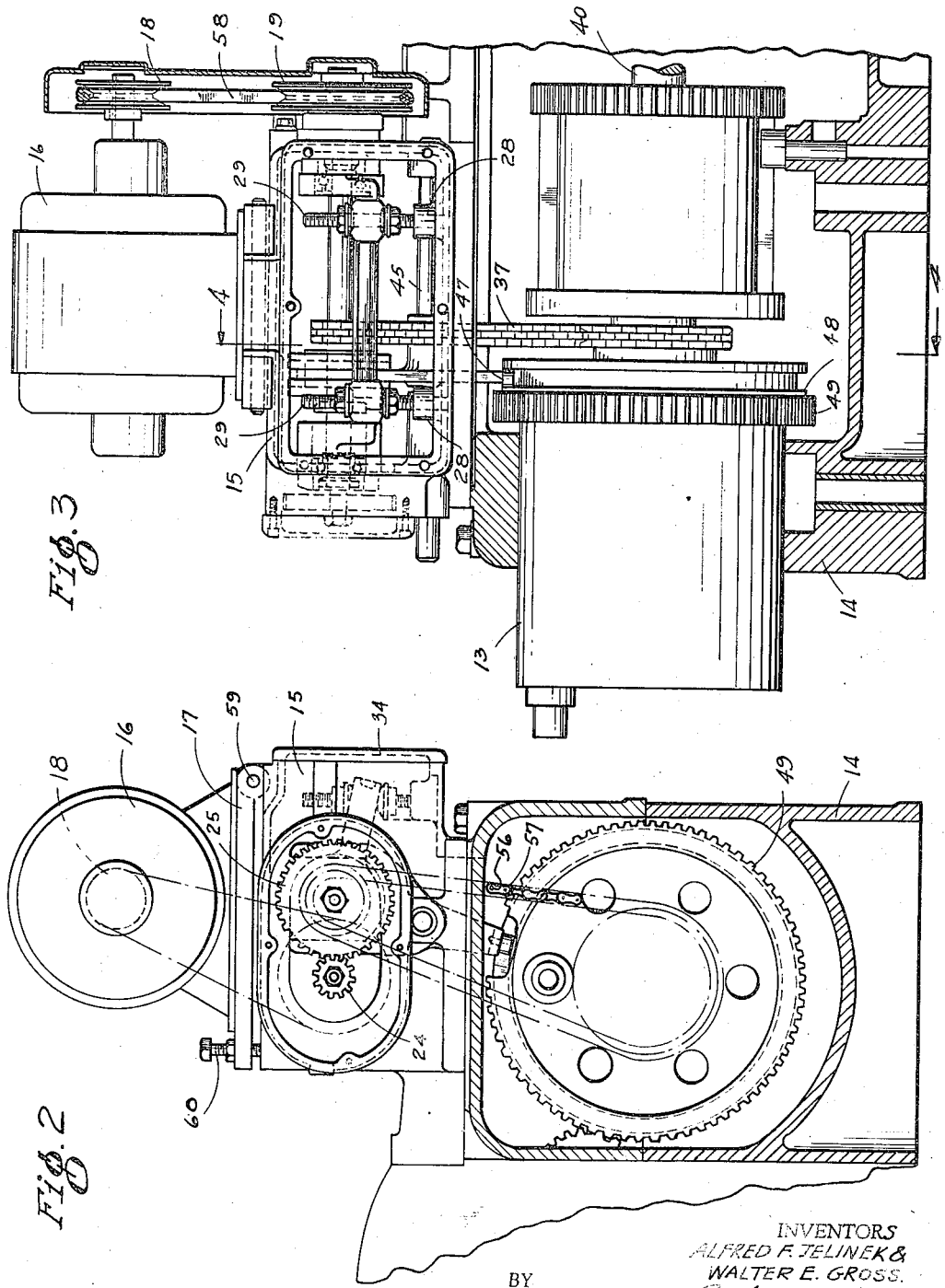

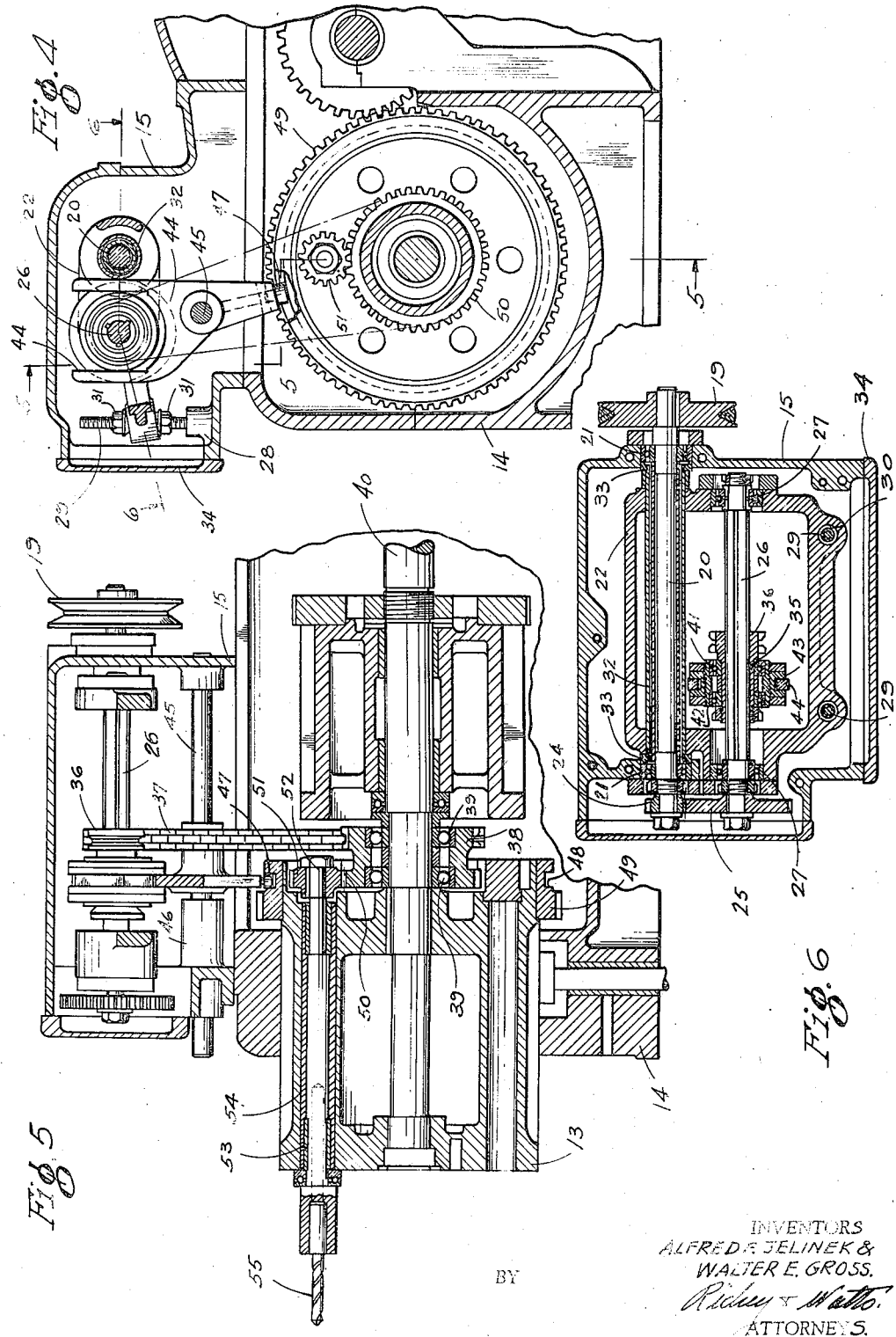

2,229,701

UNITED STATES PATENT OFFICE 2,229,701

POWER DRIVE FOR TURRET TOOLS

Alfred F. Jelinek and Walter E. Gross, Cleveland, Ohio, assignors to The Cleveland Automatic Machine Company, Cleveland, Ohio, a corporation of Ohio Application March 4, 1940, Serial No. 322,186

4 Claims. (Cl. 29—40)

This invention relates broadly to automatic screw machines and more specifically to improvements in mechanisms for effecting the rotation of tools mounted within the tool turret.

One of the objects of the invention is to provide an independent power driving unit for tools mounted in a screw machine tool turret which will facilitate the operation of the driving connections between the power unit and the tools during the reciprocative movement of the turret.

Another object of the invention is to construct a power driving unit for rotating the tools mounted in a turret, which is adapted to accommodate the ready attachment of the unit upon a screw machine and to construct the unit to accommodate adjustments for changing the speed of the rotative driving elements connected with the tools.

Another object of the invention is to provide a power take-off mechanism and tool turret construction which will facilitate the assembly of a plurality of tools within the turret and the operation thereof during the operative cycle of the machine.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is a front elevational view of a single spindle automatic screw machine embodying the improved power driving unit for rotating the tools mounted in the turret;

Fig. 2 is an end elevation of the improved drive mechanism and a fragmentary portion of the screw machine shown in Fig. 1, a portion of the machine being broken away and shown in section in order to illustrate with greater clarity the driving connections between the power unit and the turret;

Fig. 3 is a front elevational view of the improved drive unit and a portion of the screw machine illustrated in Fig. 1, certain parts thereof being removed or broken away and shown in section in order to illustrate the driving connections and relation of parts within the drive gear casing and turret housing;

Fig. 4 is a vertical section through the power drive unit and the fragmentary portion of the machine shown in Figs. 2 and 3, the section being taken on a plane indicated by the line 4—4 in Fig. 3;

Fig. 5 is a longitudinal section through the power drive unit and a fragmentary portion of the screw machine, the section being taken on a plane indicated by the line 5—5 in Fig. 4; and Fig. 6 is a transverse section through the upper portion of the power drive unit, the section being taken on a plane indicated by the line 6—6 in Fig. 4.

Referring first to Fig. 1, the screw machine illustrated herein embodies a base 10 having a spindle drive housing 11 mounted thereon, a work holding spindle 12 therein, a tool turret 13 and a housing 14 therefor which also contains the drive mechanism for effecting the reciprocative movement of the turret. The improved power drive unit comprises a casing 15 mounted upon the upper face of the housing 14 superjacent the turret and drive gear mechanisms therefor. The source of power for the driving unit is derived from an electric motor 16 preferably secured upon a plate 17 hinged to the upper portion of the casing 15. The armature shaft of the motor 16 is provided with a drive pulley 18 belted to a sheave 19 keyed upon a shaft 20, which, as will be seen in Fig. 6, is journaled in anti-friction bearings 21 mounted in a frame 22 fulcrumed in bearings 23 in the casing 15. The end of the shaft 20 is provided with a pinion 24 which is intermeshed with a gear 25 keyed upon a spline shaft 26 mounted in anti-friction bearings 27 supported in the frame 22. The casing 15 is formed with bosses 28 (see Fig. 4) drilled and tapped to receive studs 29, which are threaded throughout their length and arranged to extend through clearance holes 30 formed in the arm of the forward end portion of the frame 22. Upon the studs 29 there are nuts 31 disposed for engagement with opposed faces of the arm portion of the frame 22 and provided to facilitate angular adjustments of the frame about its pivotal support within the bearings 23. The support of the frame is effected through a sleeve 32 disposed in telescopic relation with the shaft 20, the ends of the sleeve being mounted in bearing bushings 33 journaled in the hub portion of the casing 15, which also receive the anti-friction bearings 21 for the shaft 20. The forward end of the casing 15 is formed with an opening to accommodate access to the adjusting nuts 31 and driving connections mounted within the casing. The opening is covered by a plate 34 which is preferably mounted upon the casing in such a manner as to facilitate the ready removal thereof.

Upon the spline shaft 26 there is a sleeve 35 formed with a sprocket 36 in the end thereof over which there is trained a chain 37 connected with a sprocket 38 mounted upon anti-friction bearings 39 on the turret push rod 40. Adjacent the sprocket 36 there is a pair of anti-friction bearings 41 supporting a sleeve 42 and in turn a collar 43 which is machined with a groove in the periphery thereof for the reception of the arms of a guide yoke 44 (see Fig. 4) mounted upon a rod 45, slidably supported in bosses 46 in the interior of the casing 15. The yoke 44 is constructed with an arm extending into the housing 14 through openings formed in the base of the casing 15 and the portion of the housing above the turret 13. Upon the end of the arm there is a roller 47 mounted for engagement within a groove 48 in the face of the index gear 49 adjacent the inner end of the turret 13. The sprocket 38 is formed to embody a spur gear 50 which is intermeshed with a pinion 51 keyed to a spindle 52 mounted in bearings 53 within a tube 54 in one of the bores in the tool turret 13. Although but one of the tool spindle assemblies is illustrated herein it is to be understood that such assemblies are designed for interchangeable use in any of the turret bores and that as many stations in the turret may be employed contemporaneously as desired.

The tool drive mechanism disclosed herein is designed for use in conjunction with a tool turret of the type which is reciprocated towards and away from the work and indexed from station to station about the medial axis of the turret. Thus, in operation, when a drill 55 or similar tools or cutters are mounted in the turret such tool or tools may be rotatively driven by the electric motor 16 through the shaft 20, gears 24 and 25, sprockets 36 and 38, the gears 50 and tool drive pinion 51, the rotative speed thereof being governed by the gear ratio chosen for the pinion 24 and gear 25. As the tool turret is indexed the pinion 51 is merely advanced through its path about the circumference of the planetary gear 50. During the reciprocation of the turret the sprocket 36 is moved along the spline shaft 26 by the yoke arm 44.

In assembly of the turret tool driving unit upon the machine the chain 37 is first looped about the sprocket 38, the free ends thereof being held in suspension until the casing 15 is adjusted into position. The ends of the chain 37 are next united by inserting the pin 56 in the loose link 57 in the chain 37. The frame 22 is then rocked about its fulcrum until suitable driving tension upon the chain is effected whereupon the nuts 31 are adjusted in seated relation upon the frame. The driving belt 58 from the electric motor 16 to the sheave wheel 19 may be tightened by rocking the plate 17 upon its fulcrum 59, then adjusting the jack screw 60 in the forward end of the plate 17.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

We claim:

1. In a screw machine embodying a turret housing, a tool turret and a push rod for reciprocating said turret, mechanism for rotatively driving a cutting tool mounted in one of the tool stations in said turret comprising, a gear casing mounted on said turret housing, a splined drive shaft therein, a sprocket slidably mounted on said drive shaft, a sprocket mounted on said push rod, driving connections between said sprockets, a cutting tool journaled in a tool station in said turret, a pinion mounted thereon, a gear mounted on said push rod intermeshed with said pinion and connected to the sprocket on said push rod, and means in said gear case coordinated with said turret to effect the reciprocation of the sprocket in said gear case contemporaneous the movement of said turret.

2. In a screw machine embodying a turret housing, a tool turret and a push rod for reciprocating said turret, mechanism for rotatively driving a cutting tool mounted in one of the tool stations in said turret comprising, a gear casing mounted on said turret housing, a drive shaft therein, a driving member keyed thereto for sliding movement thereon, a driven member mounted on said push rod, driving connections intermediate said driving and driven members, a cutting tool journaled in said turret, a pinion mounted thereon, and intergeared with said driven member on said push rod and means coordinated with said driving member and said turret to effect the reciprocation of the driving member with said turret.

3. In a screw machine including a turret housing, a tool turret and a push rod for reciprocating said turret, mechanism for rotatively driving a cutting tool mounted in one of the tool stations in said turret, comprising a gear casing mounted on said turret housing, a splined drive shaft therein, a sleeve having a sprocket formed thereon and slidably mounted on said drive shaft, a collar having a groove therein affixed to said sleeve, a yoke mounted in said groove in the collar, a sprocket mounted on said push rod, driving connections between said sprockets, a cutting tool spindle journaled in a tool station in said turret, a pinion mounted on said driving tool spindle, a gear mounted on said push rod and intergeared with said pinion on said spindle, an index gear mounted on said turret having a groove therein, a roller on the end of the yoke engaged in said groove, said yoke engaged in said groove in the collar to effect the reciprocation of the sleeve in said gear casing contemporaneous with the movement of said turret.

4. In a screw machine including a turret housing, a tool turret and a push rod for reciprocating said turret, mechanism for rotatively driving a cutting tool mounted in one of the tool stations in said turret, comprising a gear casing mounted on said turret housing, a drive shaft therein, a pinion mounted thereon, a frame fulcrumed on said drive shaft, a splined jack shaft mounted in said frame, a gear mounted thereon intermeshing with said pinion, a sprocket slidably mounted on said jack shaft, a sprocket mounted on said push rod, a link belt entrained over said sprockets, a cutting tool journaled in a tool station in said turret, a pinion mounted thereon, a gear mounted on said push rod intermeshed with said pinion and connected to the sprocket on said push rod, and means in said gear casing coordinated with said frame to facilitate driving tension upon the sprocket for rotating said cutting tool.

ALFRED F. JELINEK.
WALTER E. GROSS.